(12) United States Patent  (10) Patent No.: US 7,525,223 B2
Chen  (45) Date of Patent: Apr. 28, 2009

(54) INDUCTION MOTOR HAVING THE ROTOR LOCATED WITHIN A SHELL

(76) Inventor: Yue Chung Chen, 31 Sharon Ct., Metuchen, NJ (US) 08840

( * ) Notice: Subject to any disclaimer, the term of this patent is extended or adjusted under 35 U.S.C. 154(b) by 28 days.

(21) Appl. No.: 10/823,847

(22) Filed: Apr. 14, 2004

(65) Prior Publication Data

US 2005/0231051 A1 Oct. 20, 2005

(51) Int. Cl.
*H02K 9/00* (2006.01)
(52) U.S. Cl. .......................................... 310/52; 310/64
(58) Field of Classification Search .................... 310/52, 310/54, 58, 64
See application file for complete search history.

(56) References Cited

U.S. PATENT DOCUMENTS

| | | | | |
|---|---|---|---|---|
| 3,904,901 A | * | 9/1975 | Renard et al. ................. | 310/52 |
| 5,017,821 A | * | 5/1991 | Shervington et al. ...... | 310/68 D |
| 5,873,710 A | * | 2/1999 | Tucker ..................... | 417/410.5 |
| 6,129,477 A | * | 10/2000 | Shoykhet ..................... | 403/267 |
| 6,713,927 B2 | * | 3/2004 | Kikuchi et al. .............. | 310/214 |

* cited by examiner

*Primary Examiner*—Nguyen N Hanh
(74) *Attorney, Agent, or Firm*—Fulwider Patton LLP

(57) ABSTRACT

The magnetic flux generated by stator electrical winding can flow inside motor stator structure, so it is unnecessary to put the stator electrical winding and the rotor in the same medium. The stator and rotor can be separated by repositioning the dome of a hermetic (or semi hermetic) refrigeration (or air condition) system inside the motor. The rotor and compressor are sealed inside the dome and the stator electrical winding is outside of the dome or shell. The compressor powered by this induction motor design can be much safer and more reliable to operate even in more critical environment (like pumping and compressing poison, dangerous gas). It will also be easier to fix a motor with a detachable stator design.

20 Claims, 19 Drawing Sheets

The edge of the stator pole is in the same plane as the inside surface of the dome (shell)

The edge of the stator pole is in the same plane as the inside surface of the dome (shell)

Stator pole part left with stator body and electrical winding after cutting

Stator pole cutting line stator

Stator pole cutting line

Stator pole part left with stator body and electrical winding after cutting

INDUCTION MOTOR HAVING THE ROTOR LOCATED WITHIN A SHELL

BACKGROUND OF THE INVENTION

The "induction motor" is a common type of motor, which gets no electrical winding in its rotor assembly, and only its stator gets electrical winding.

Textbook definition of "nonmagnetic material": materials whose permeabilities are the same as that for free space. (Examples of nonmagnetic materials include copper, and aluminum)

Textbook definition of "diamagnetic material": materials that have permeabilities slightly less than that of free space.

There are three categories of systems used in refrigeration & a/c (air condition) system: the first is hermetic system in FIG. 1 (shown with a reciprocating compressor), the second is semi hermetic (also FIG. 1), the third is open type system in FIG. 2 (shown with a reciprocating compressor).

The open type system usually handles bigger capacity than the former two systems. In the open type system, the motor is not sealed with compressor in a dome and the leak from the compressor crankshaft seal is a constant problem (FIG. 2).

In a hermetic system (including a semi hermetic system), the whole motor and compressor are sealed with refrigerant in a dome (shell), the electrical entrance in the dome is a possible refrigerant leaking spot. In this system, the spark, fire and red hot winding caused by electric short circuit of the motor electric winding are major concerns. Because the electrical winding short circuit can generate heat which can burn the motor and the. This causes environment pollution (the destroyed refrigerant must be processed and dumped) and it is expensive to repair the motor. Also a hermetic system is typically not built to handle a large capacity, because of the potential difficulties in sealing a high power motor winding with refrigerant in a dome (shell).

BRIEF SUMMARY OF THE INVENTION

The induction motor design embodying features of the present invention will separate the compressor and refrigerant from the electrical winding to prevent refrigerant from getting burned by short circuit, overheat of the winding in the hermetic (or semi hermetic) system and there is no structure opening (electrical entrance) in the dome as a possible refrigerant leak spot. This design also can make bigger capacity hermetic (also semi hermetic) system than it is now by using bigger motor.

This design also can make bigger capacity hermetic (also semi hermetic) system than it is now by using bigger motor.

Putting the stator electrical winding along with its most part of each stator pole outside the dome, leave the rest small part of each stator pole and the whole rotor assembly inside the dome (or the end edge of the stator poles are in the same plane as the inside surface of the dome), can solve the stator electrical heating problem and also there is no leak problem. With this way, a bigger motor can be used to make bigger capacity hermetic system, a capacity as open system is.

BRIEF DESCRIPTION OF THE DRAWINGS

FIG. 4-1 illustrates an enlarged part of FIG. 4.

FIG. 4-2 illustrates an enlarged part of FIG. 4.

FIG. 4-3 illustrates an enlarged part of FIG. 4.

FIG. 4-4 illustrates a cross section view of FIG. 4-3.

FIG. 4-5 illustrates an embodiment of the induction motor design with stator electrical winding.

FIG. 4-6 illustrates a cross section view of FIG. 4-5.

FIG. 4-7 illustrates an embodiment of the induction motor design with the edge of the stator pole is in the same plane as the inside surface of the dome.

FIG. 4-8 illustrates a cross section view of FIG. 4-7.

FIG. 5 illustrates an alternative embodiment of the present invention having a stator design, to show the dome, the cutting line, the stator and stator pole.

FIG. 5-1 illustrates a cross section view of FIG. 5.

FIG. 5-2 illustrates a stator pole part left with stator body after cutting.

FIG. 5-3 illustrates a cross section view of FIG. 5-2.

FIG. 5-4 illustrates an stator pole part left with dome after cutting.

FIG. 5-5 illustrates a cross section view of FIG. 5-4.

FIG. 6 illustrates a gas valve with an embodiment of the induction motor design in accordance with the present invention.

DETAILED DESCRIPTION OF THE PREFERRED EMBODIMENTS

Figure 1:
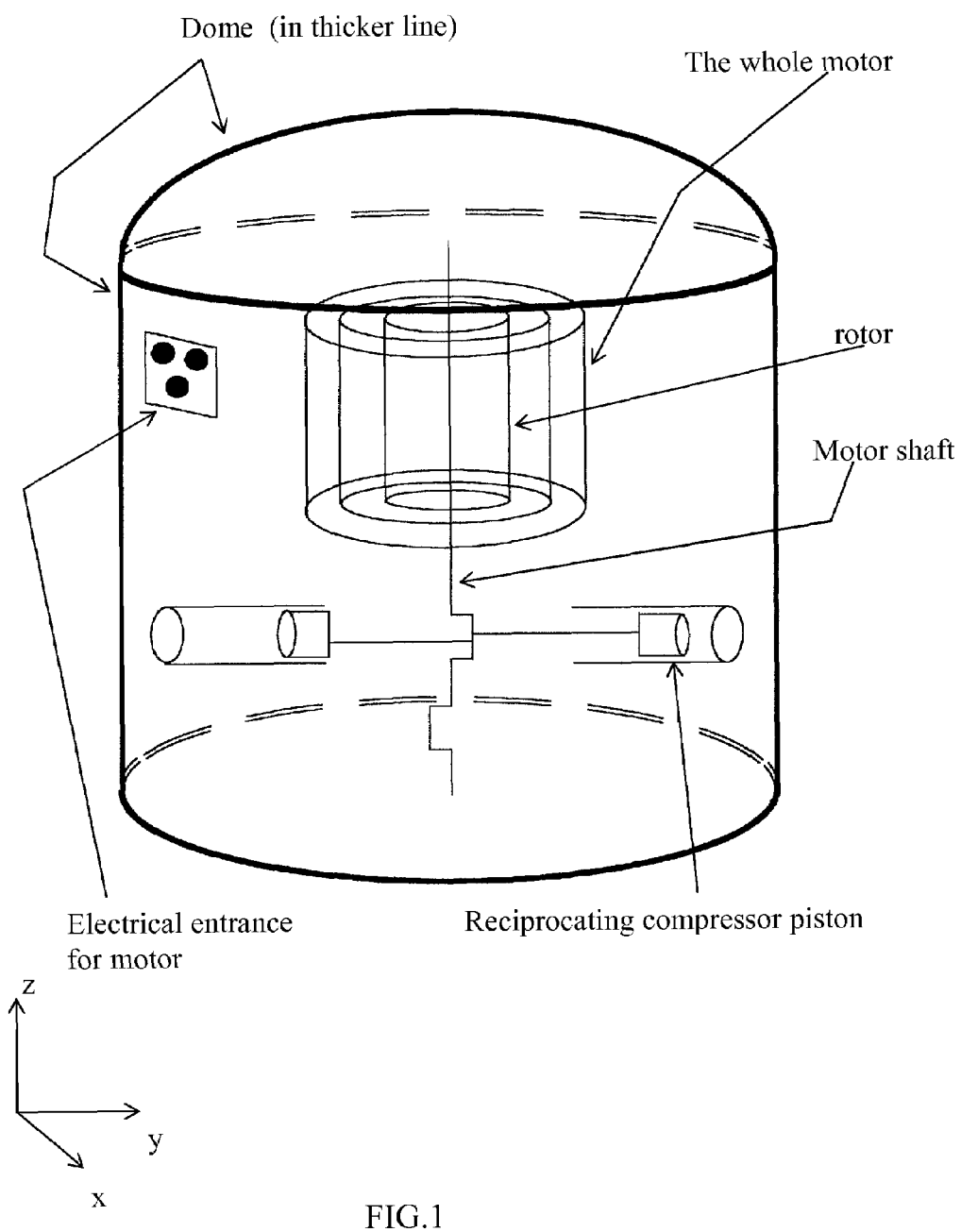
FIG. 1 illustrates a hermetic and/or semi hermetic refrigeration or air condition system.

As mentioned before, in both hermetic and semi hermetic system, the whole motor (including its stator electrical winding) are sealed in the same dome with the compressor (as shown in FIG. 1).

Figure 2:
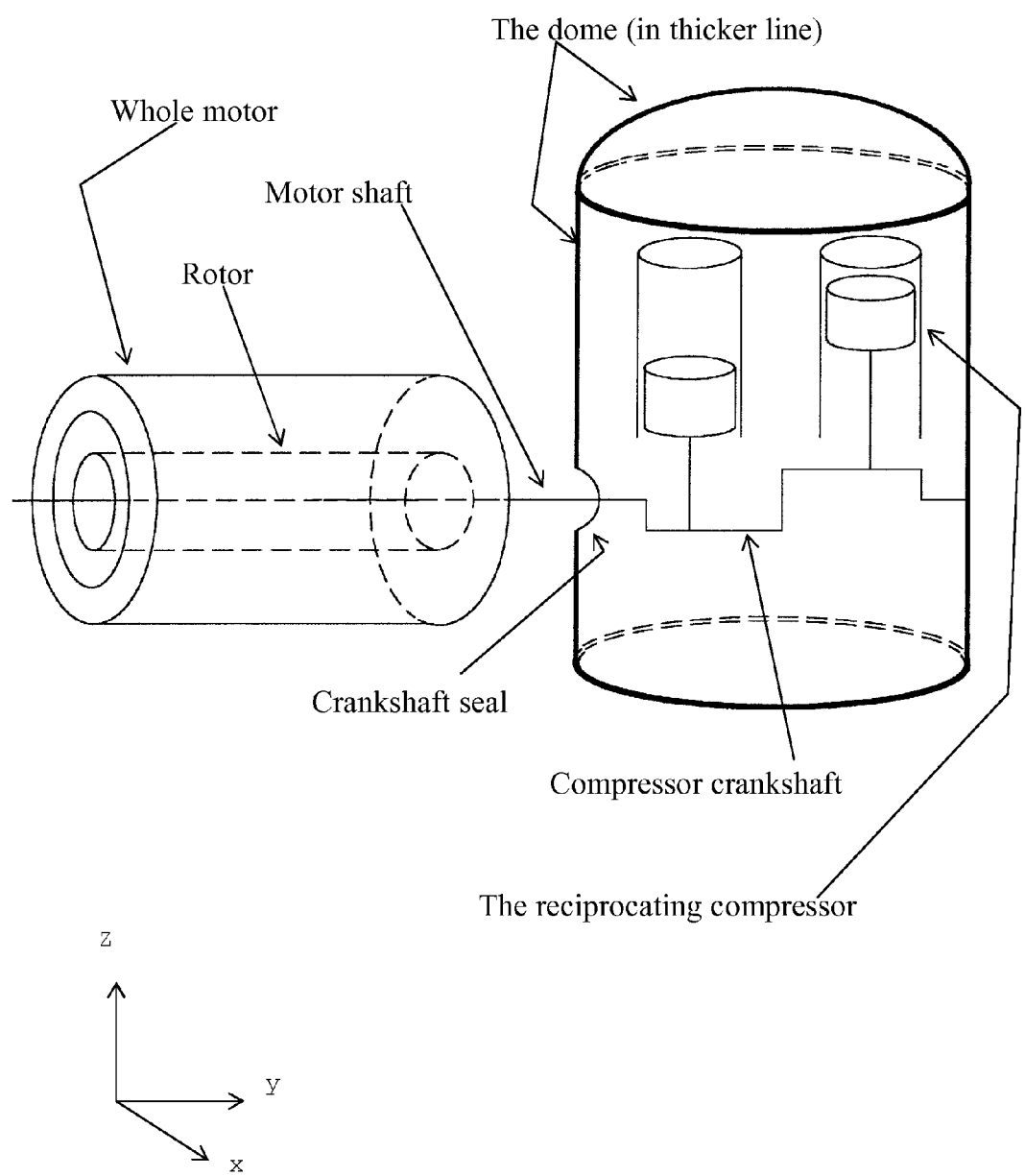
FIG. 2 illustrates an open type system of refrigeration or air condition.
Figure 3:
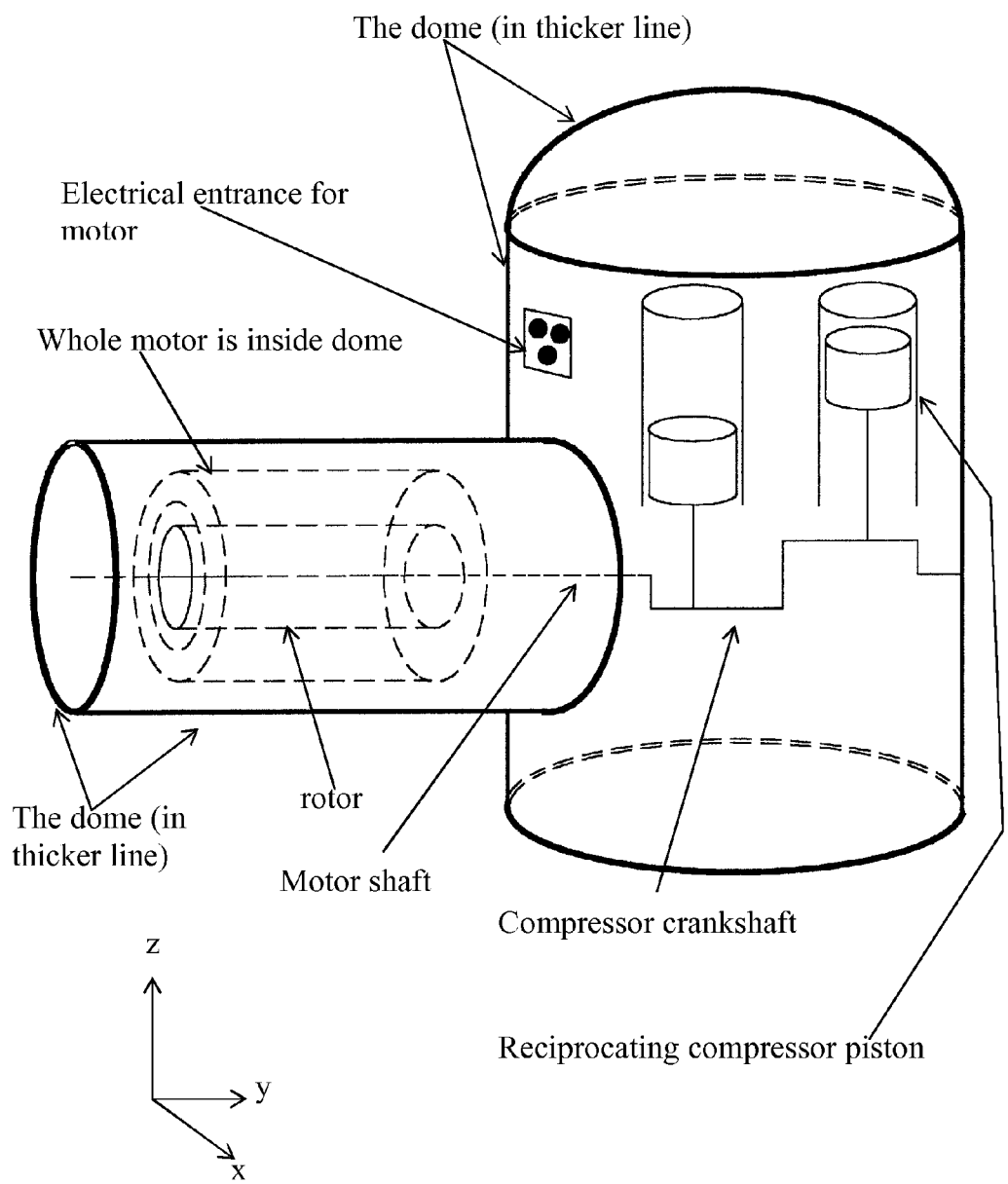
FIG. 3 illustrates an alternative view of FIG. 1.

For clarity, FIG. 3 is an alternate view of the hermetic (or semi hermetic) system illustrated in FIG. 1, in which the motor part is separated from the compressor assembly farther away. This system illustrated in FIG. 3 is different from the open system illustrated in FIG. 2. The system illustrated in FIG. 3 has no motor shaft entrance from outside. Everything is still sealed in the dome; but the direction of figure, the direction of compressor piston, the shape of dome has been modified from FIG. 1 for clarity.

Figure 4:
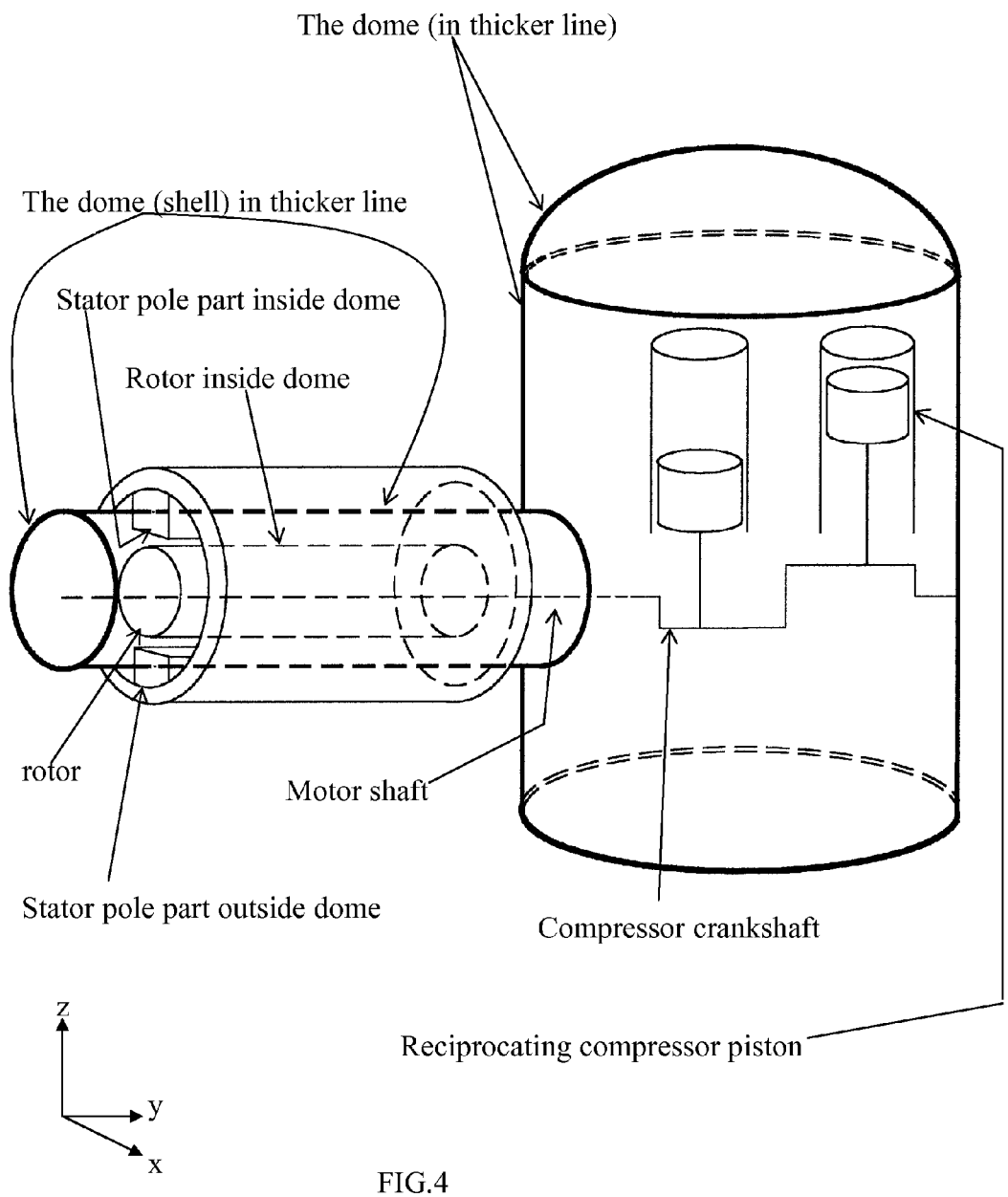
FIG. 4 illustrates an induction motor design embodying features of the present invention.
Figures 1, 4:
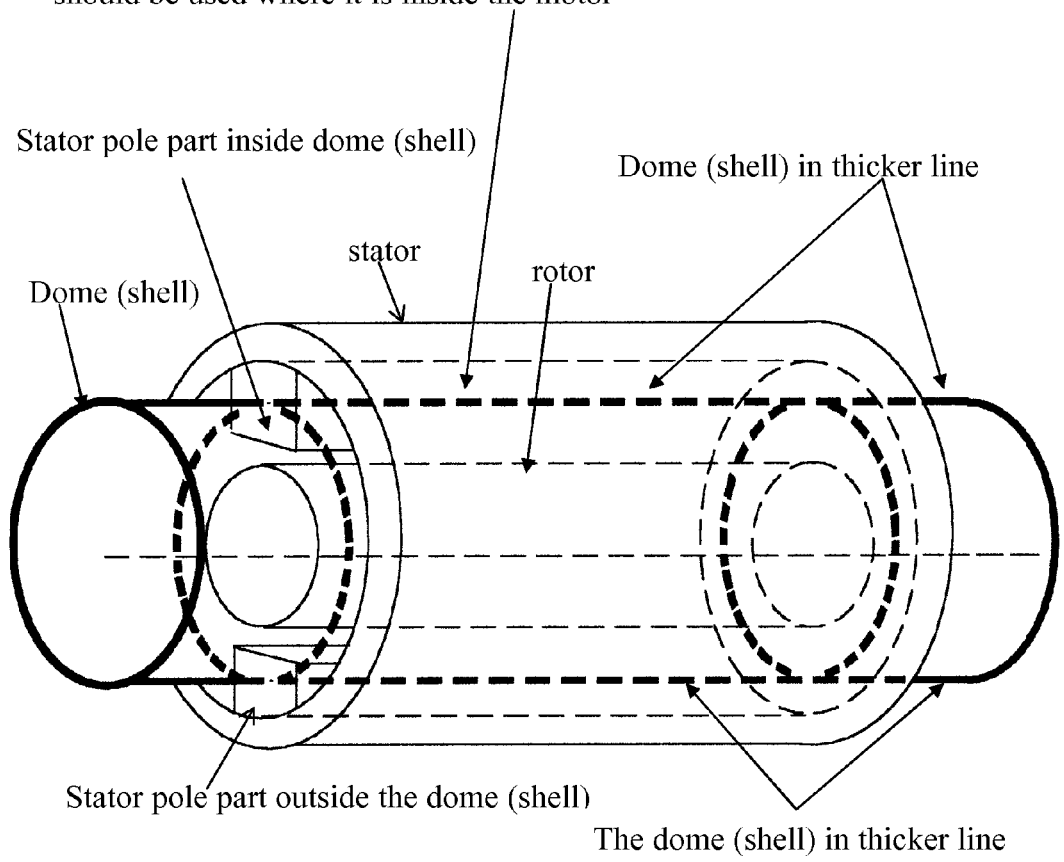
Figures 2, 4:
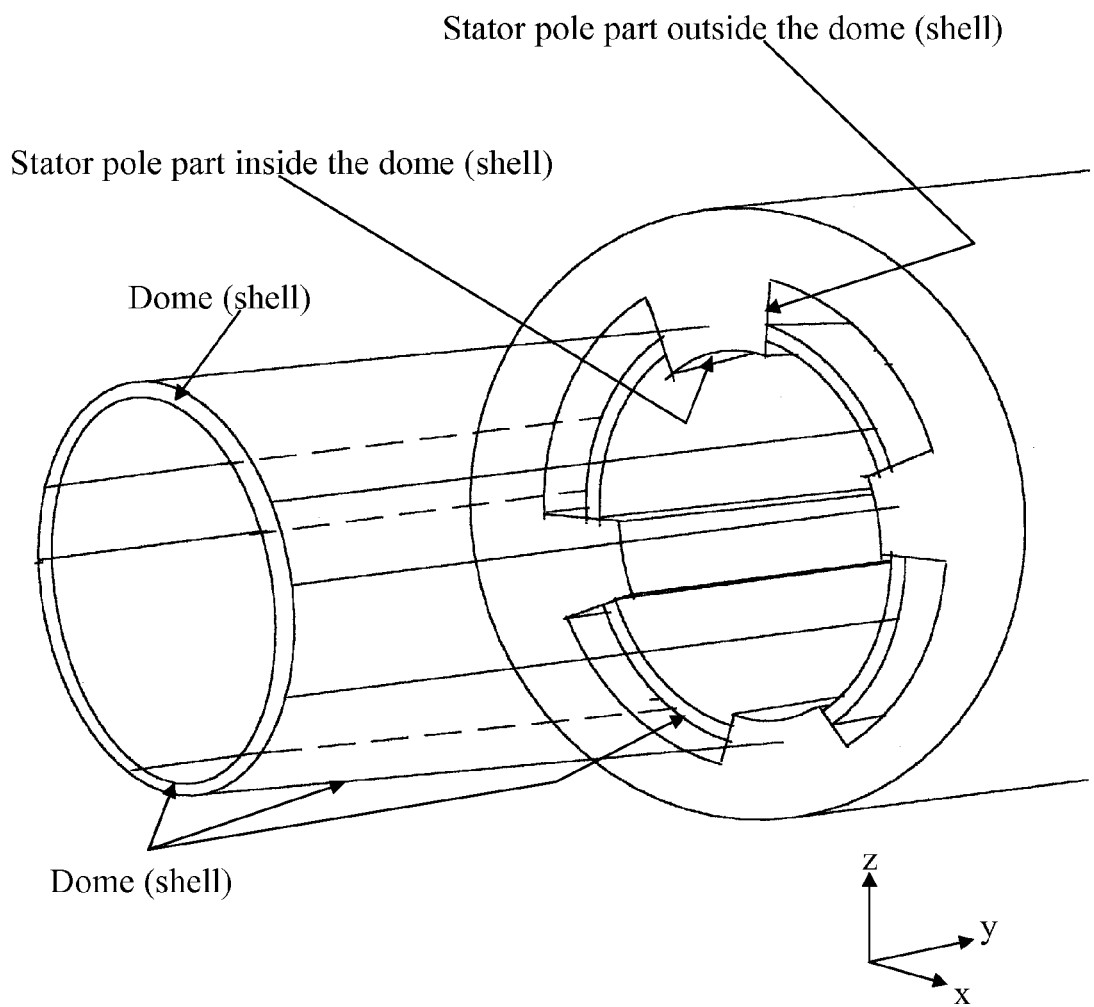
Figures 3, 4:
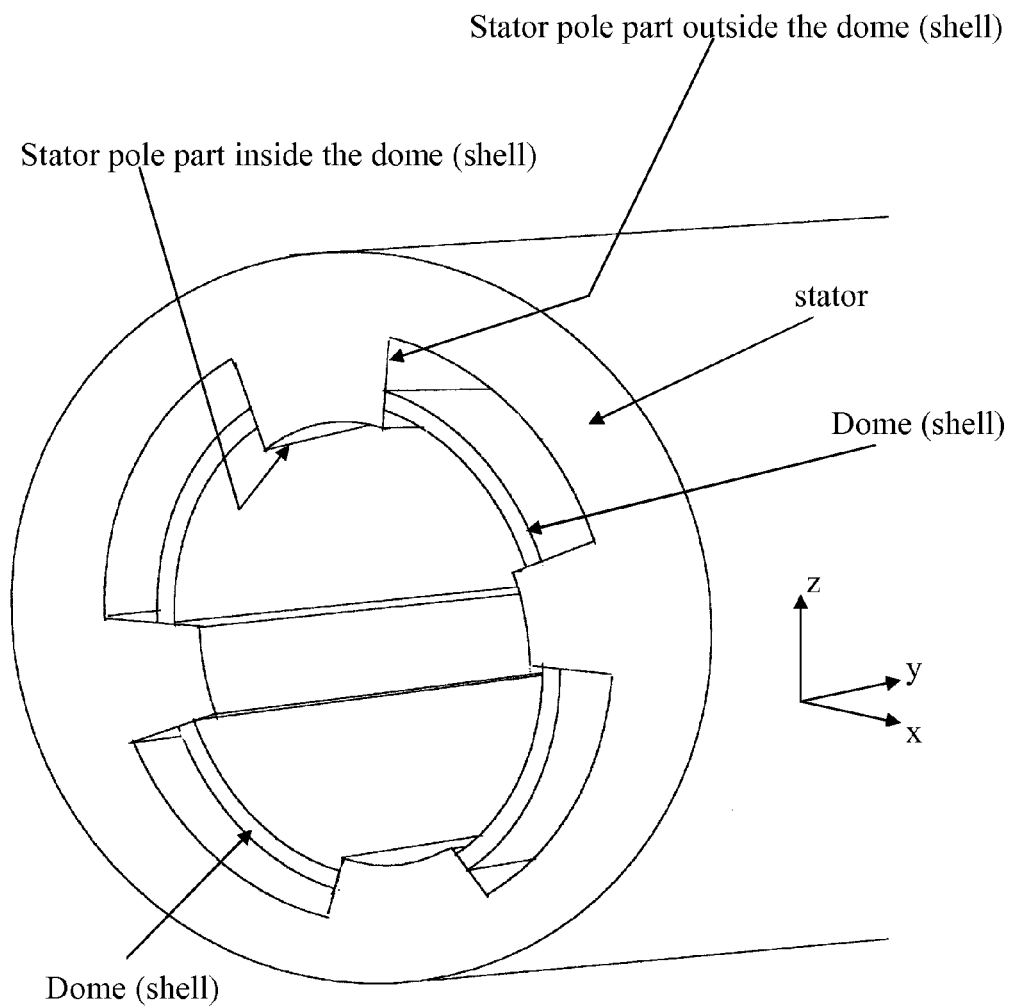
Figure 4:
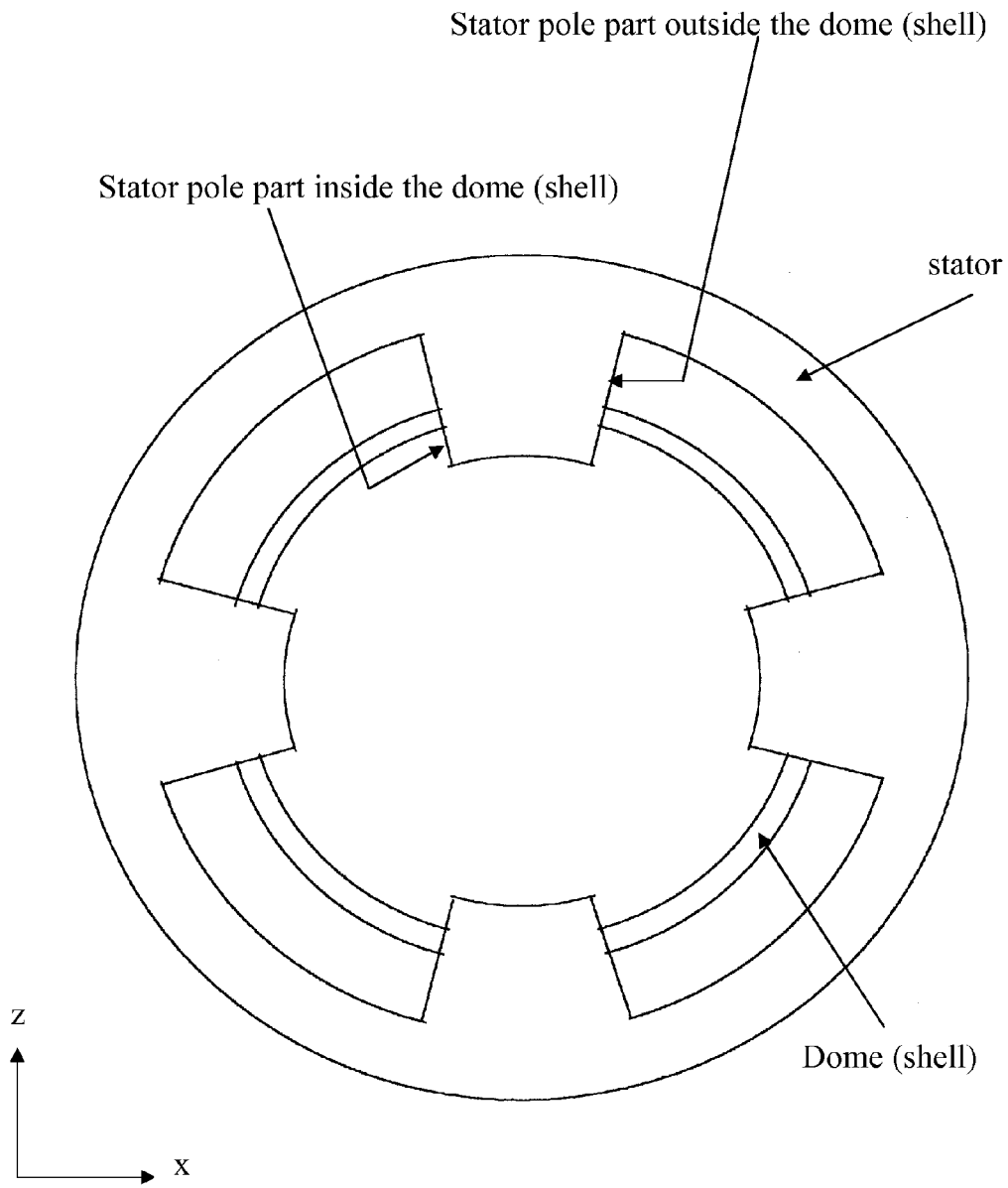

As shown in FIG. 4, the induction motor design of a preferred embodiment of the invention repositions the original dome inside the motor to put the stator electrical winding outside the dome (shown with heavy line) along with its most part of each stator pole, leave the rest small part of each stator pole and the whole rotor assembly inside the dome with the compressor. This stands in contrast to the design shown in FIG. 3. The nonmagnetic (or diamagnetic) material made dome is welded to stator poles to leave most part of each stator pole and its electrical winding outside the dome and seal a small part of each stator pole and the whole rotor assembly inside the dome with the compressor. The stator pole actually go through the dome (shell) to face the rotor directly. There is nothing between the stator pole and rotor. The distance between the stator pole and rotor is the same as that in the traditional motor. Motor efficiency will not be reduced. The part of the dome (or shell), that is surrounding the motor rotor assembly, should be nonmagnetic (or diamagnetic) material made, so the magnetic field generated by the electric winding in the motor will not be changed. The rest part of the dome (or shell) can be made with materials other than nonmagnetic (or diamagnetic) because the magnetic field in the motor will not be influenced by that part of the dome (or shell).

The enlarged part of FIG. 4 is shown in FIGS. 4-1 (dome shown with heavy line), 4-2, and 4-3. The cross section view of FIG. 4-3 is shown in FIG. 4-4.

Figures 4, 5:
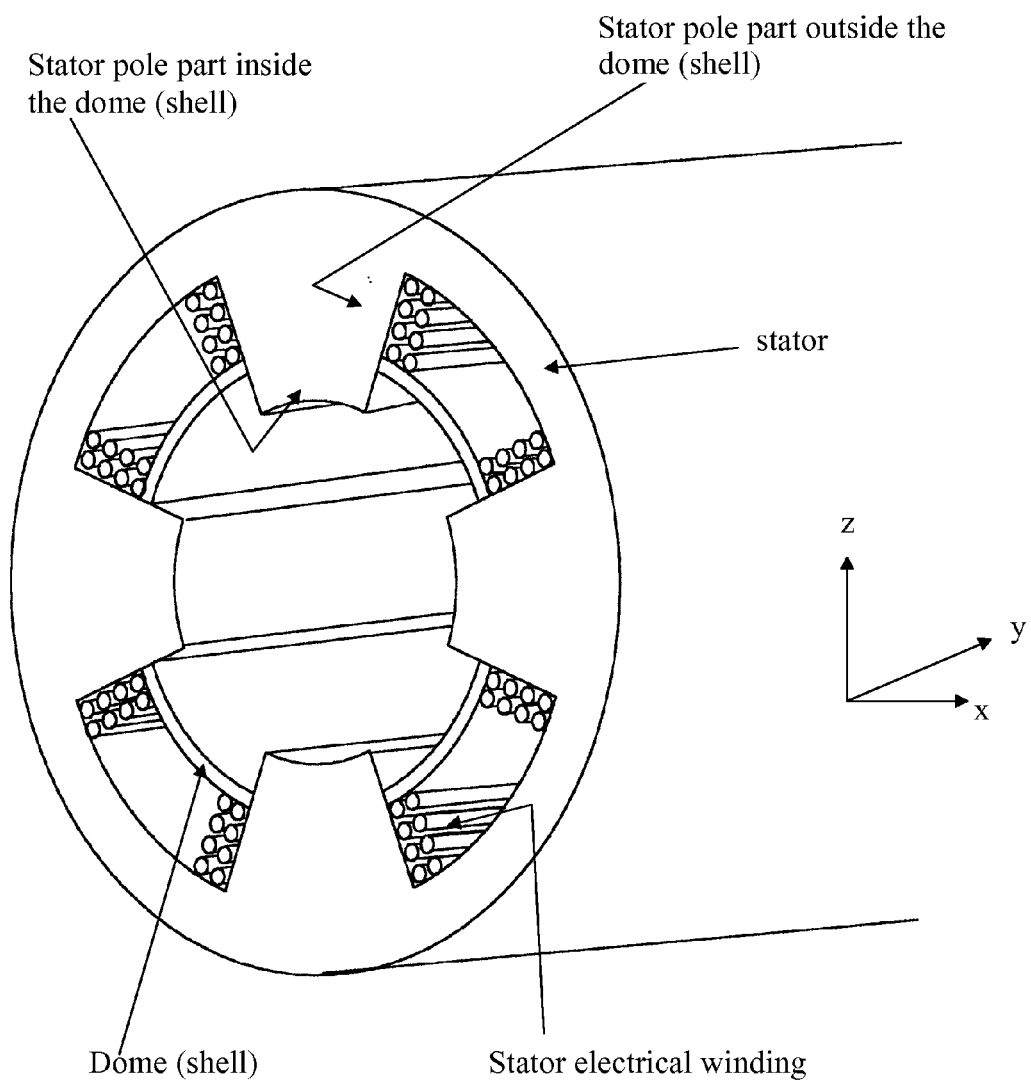
Figures 4, 5, 6:
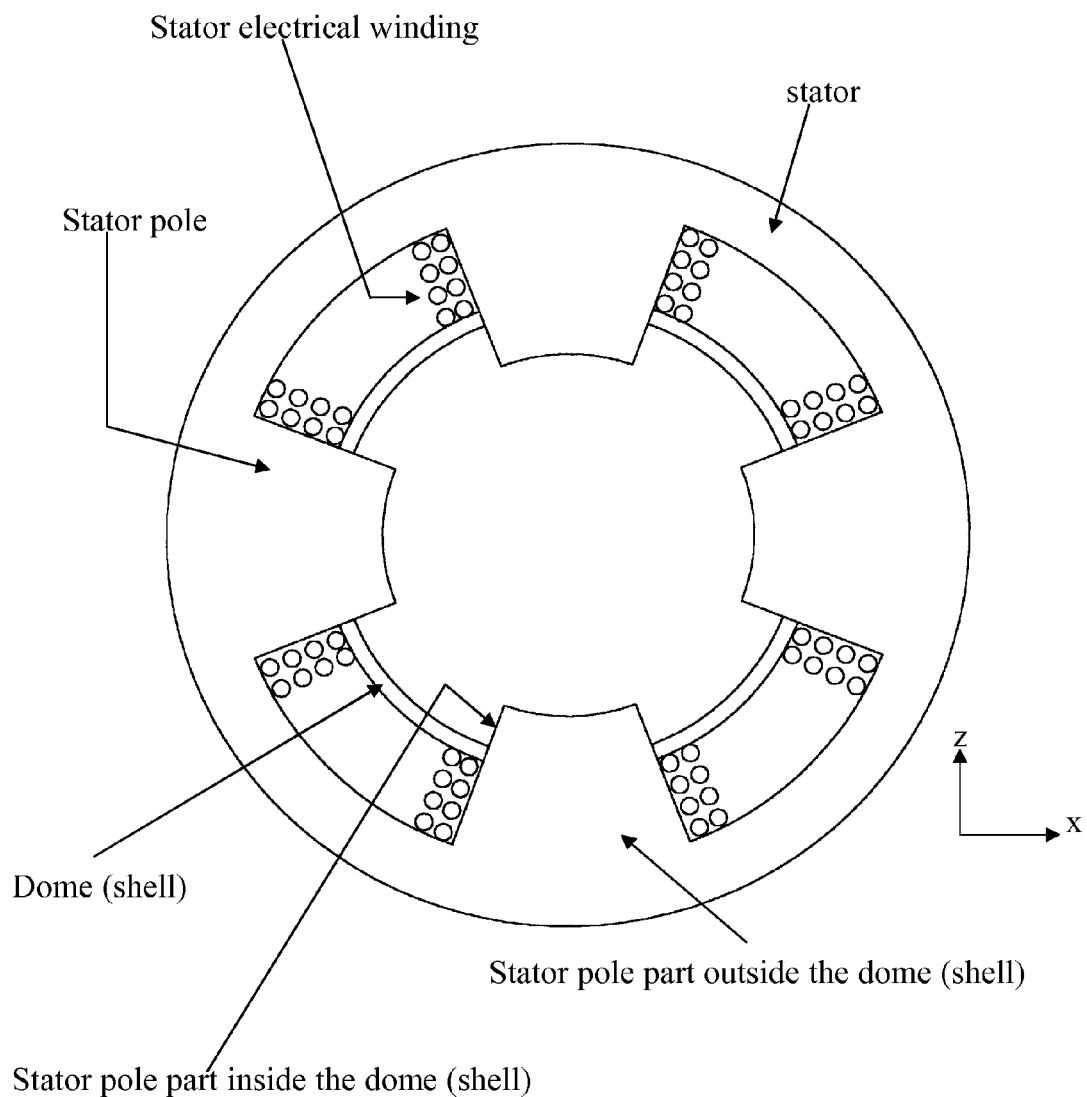
Figures 4, 5, 6, 7:
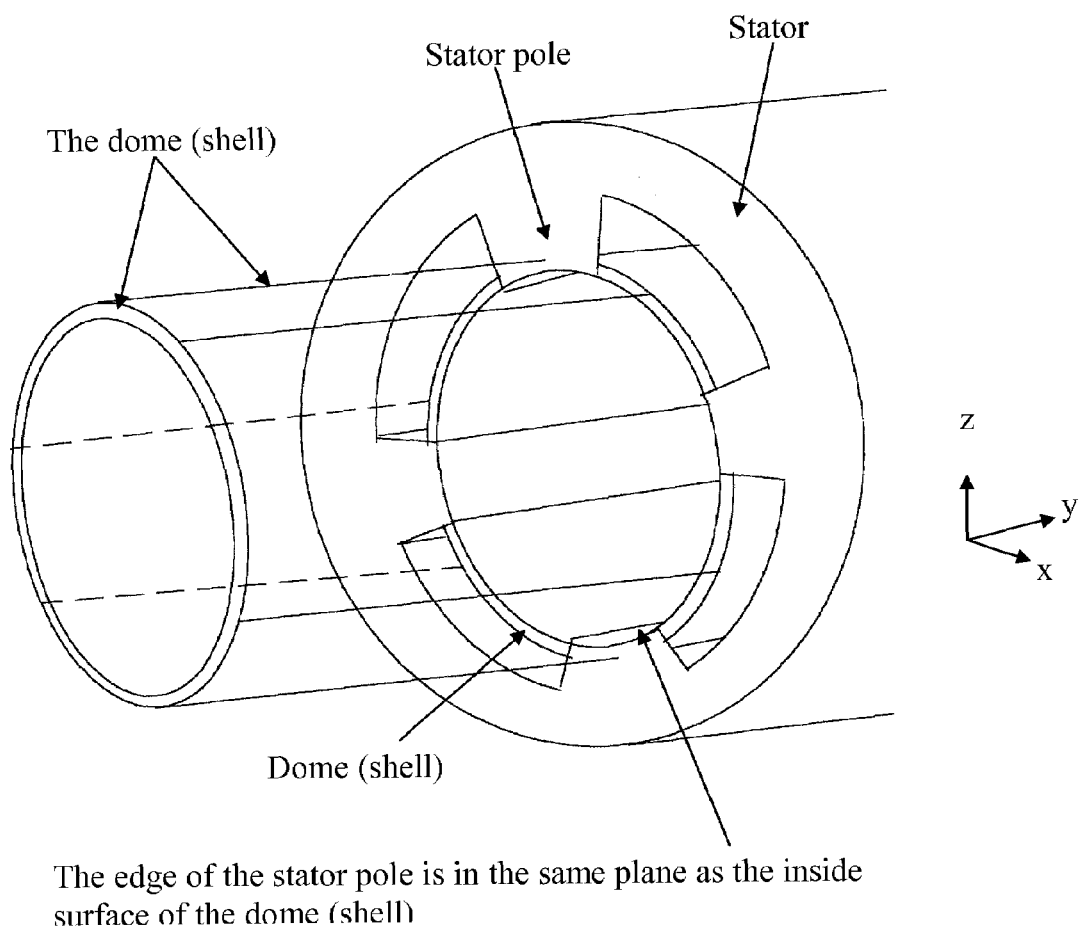
Figures 4, 5, 6, 7, 8:
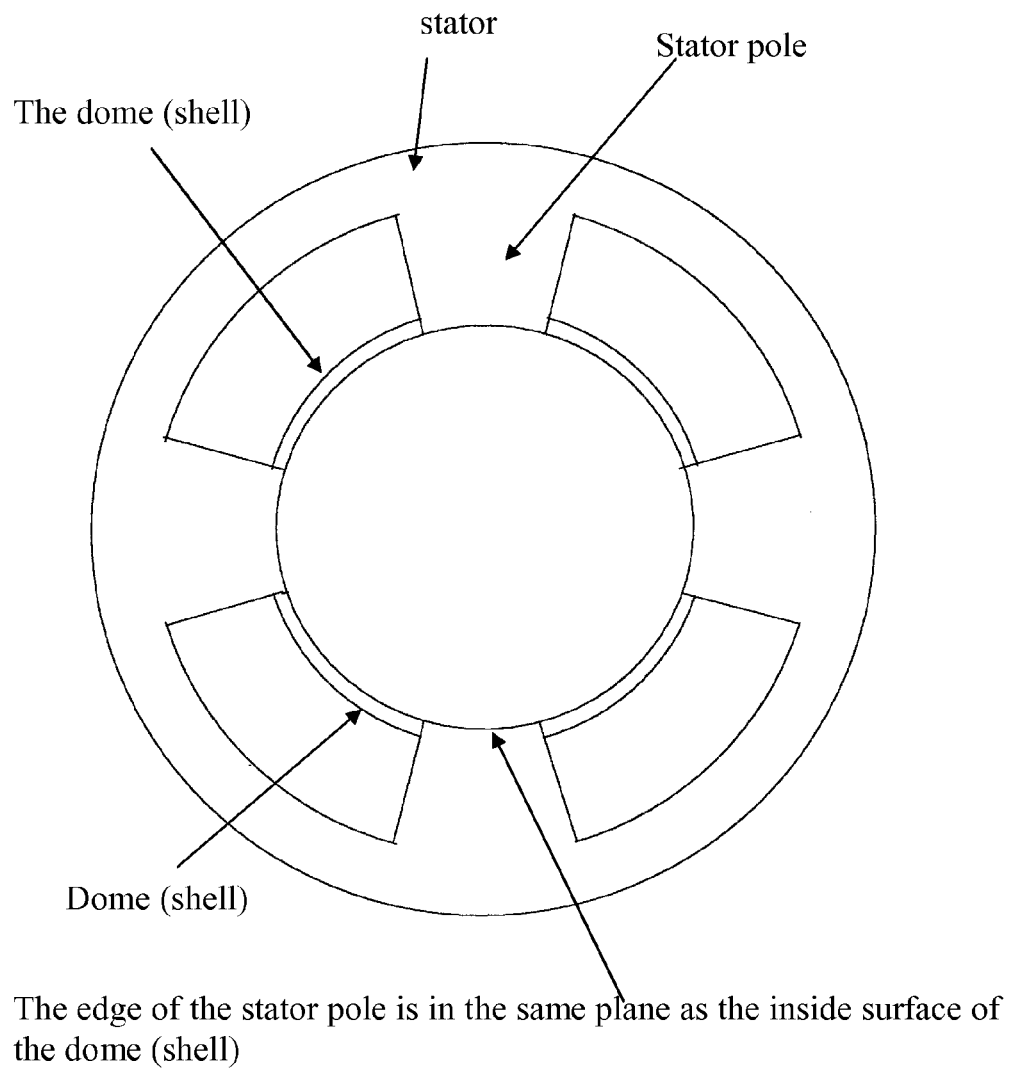
Figure 5:
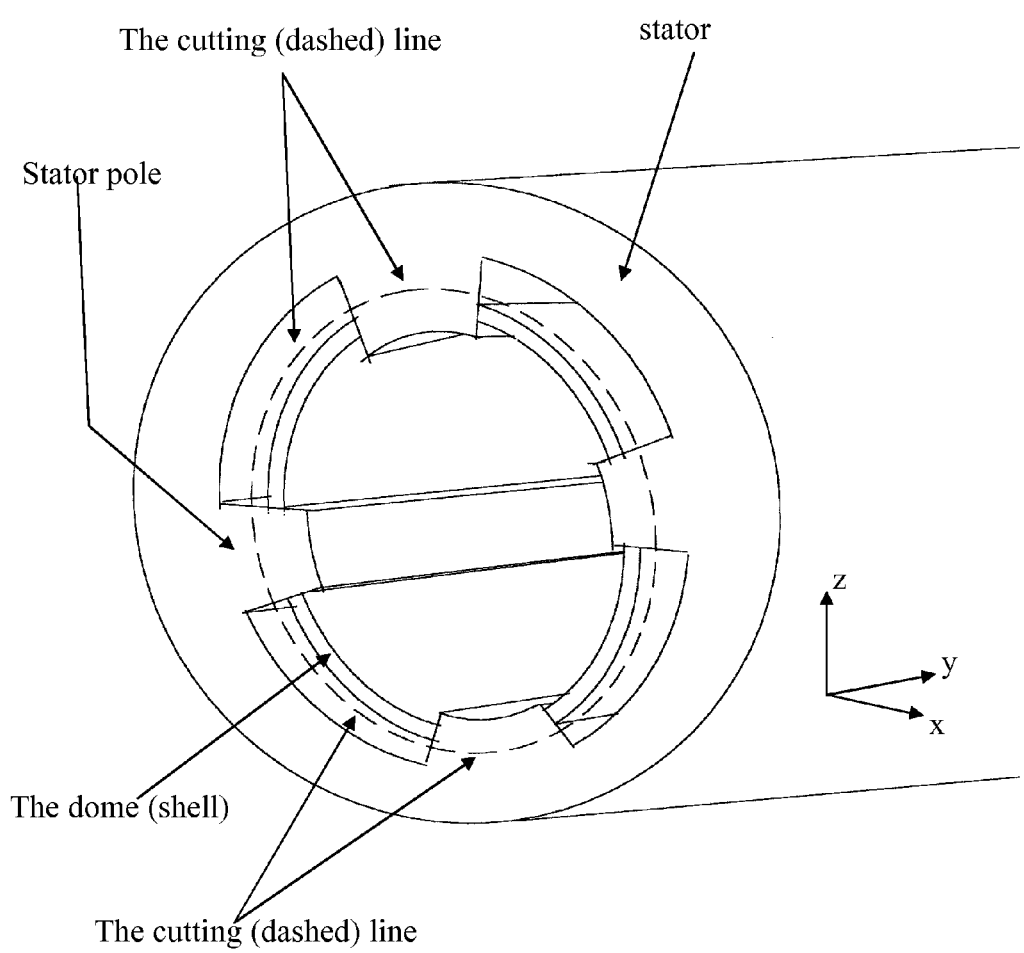
Figures 1, 5:
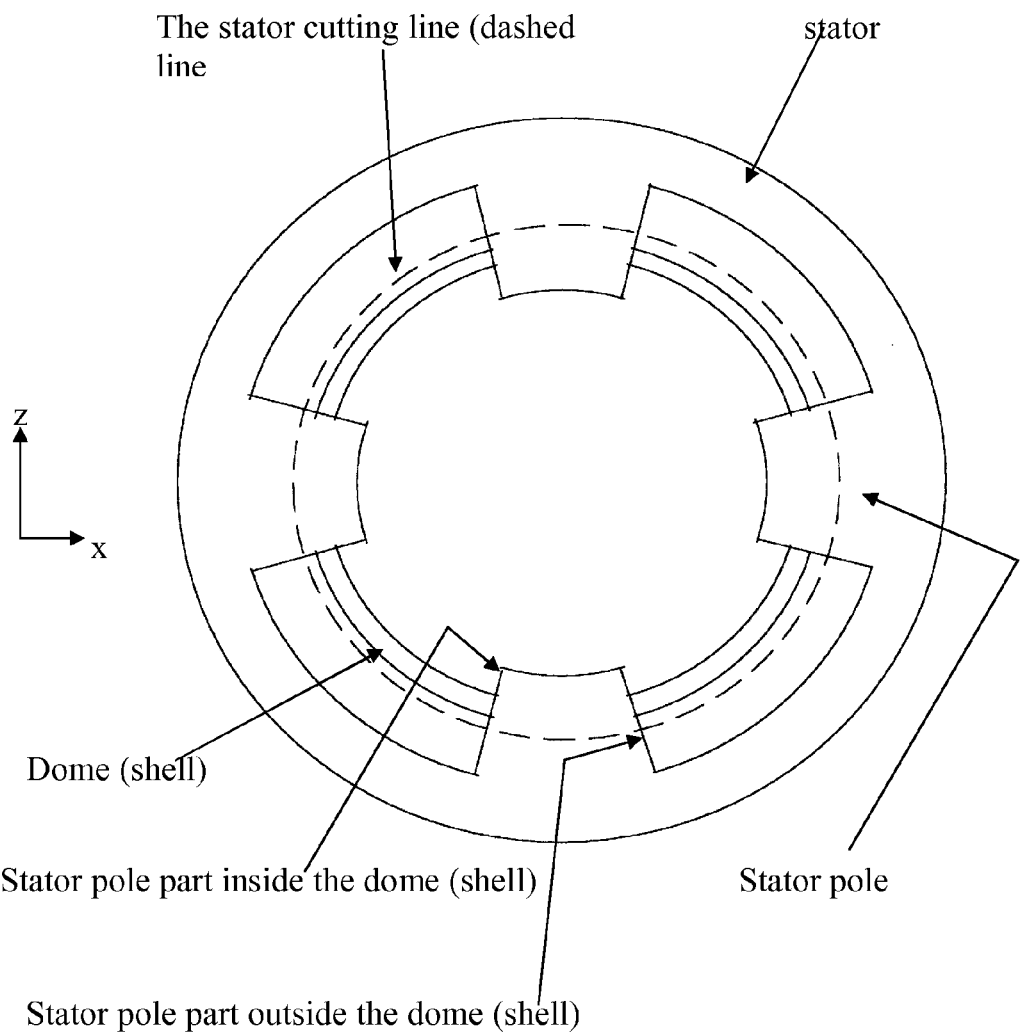
Figures 2, 5:
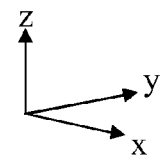
Figures 3, 5:
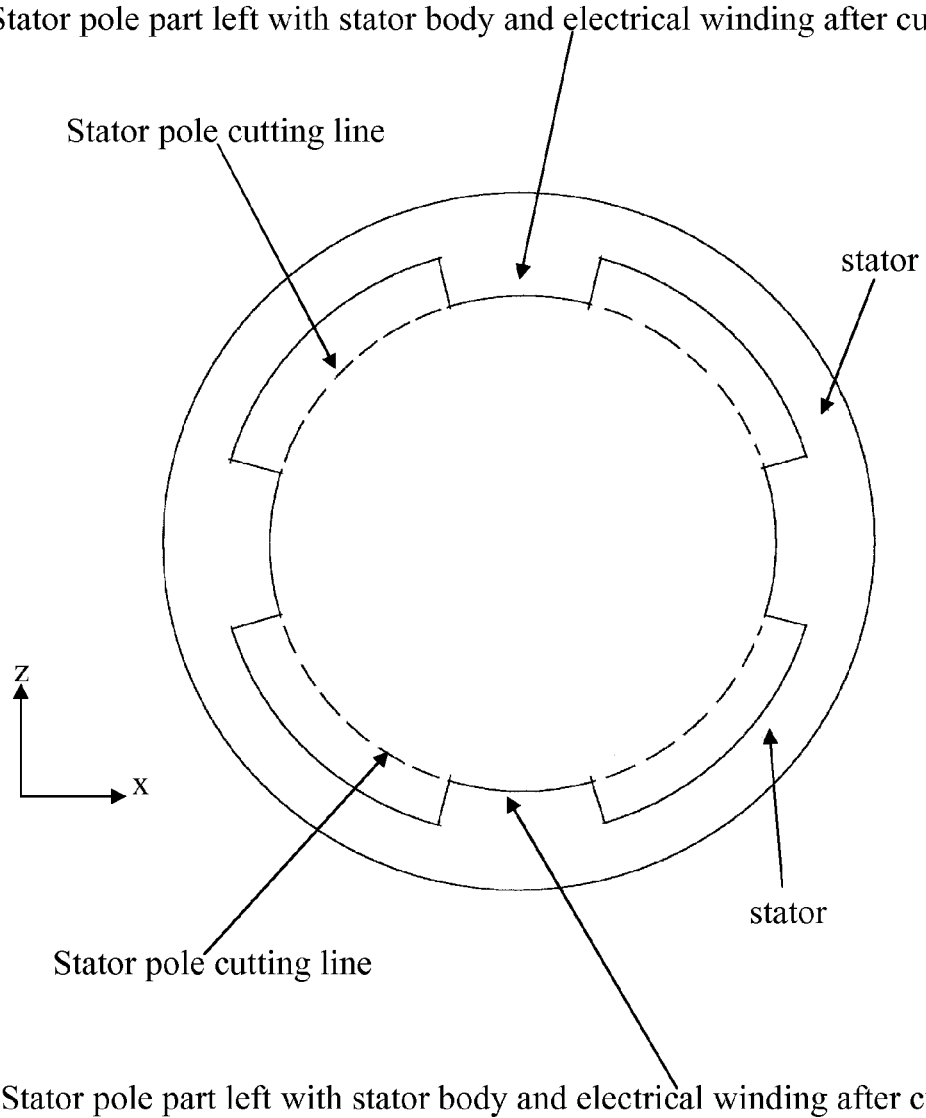
Figures 4, 5:
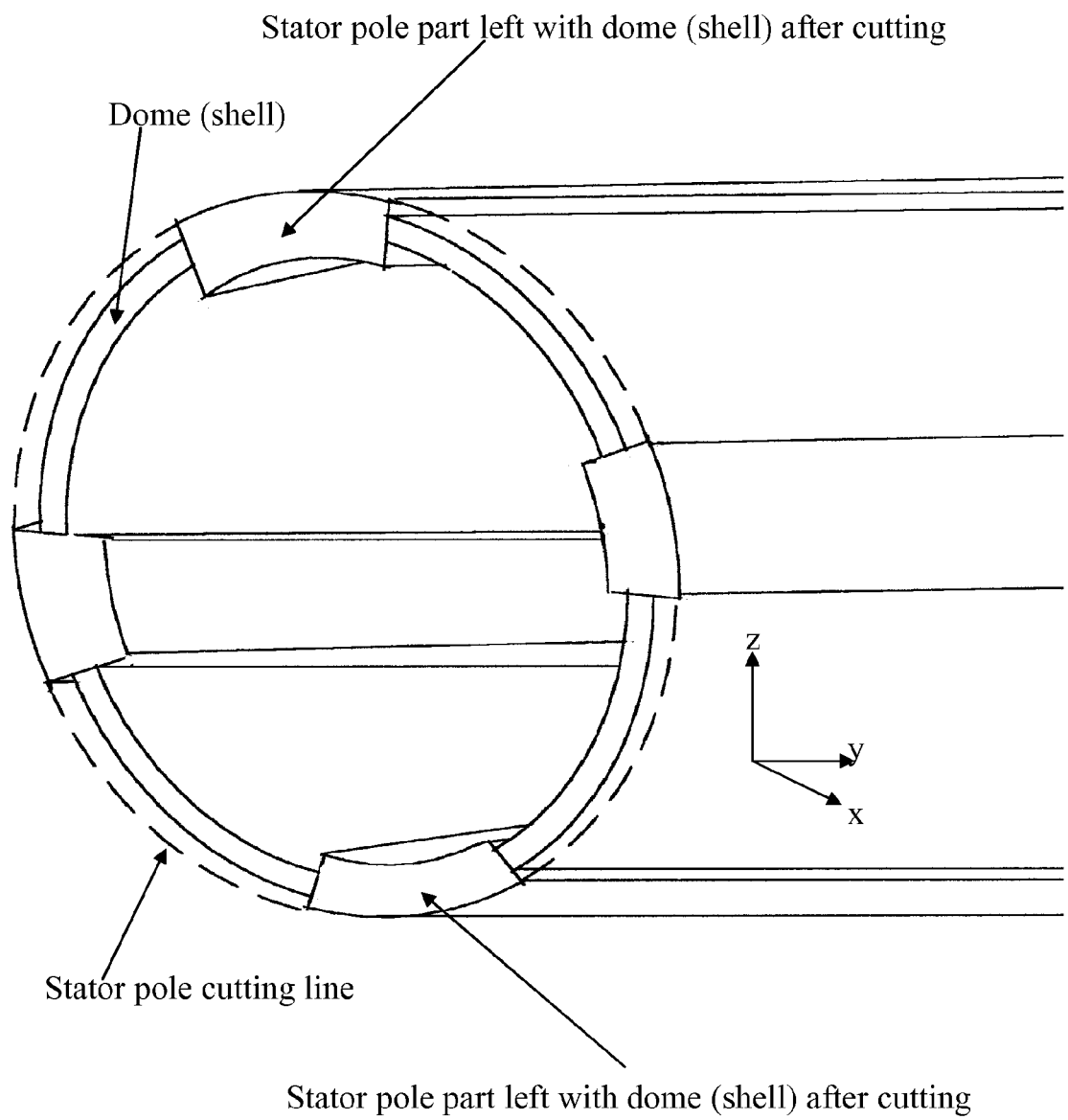
Figure 5:
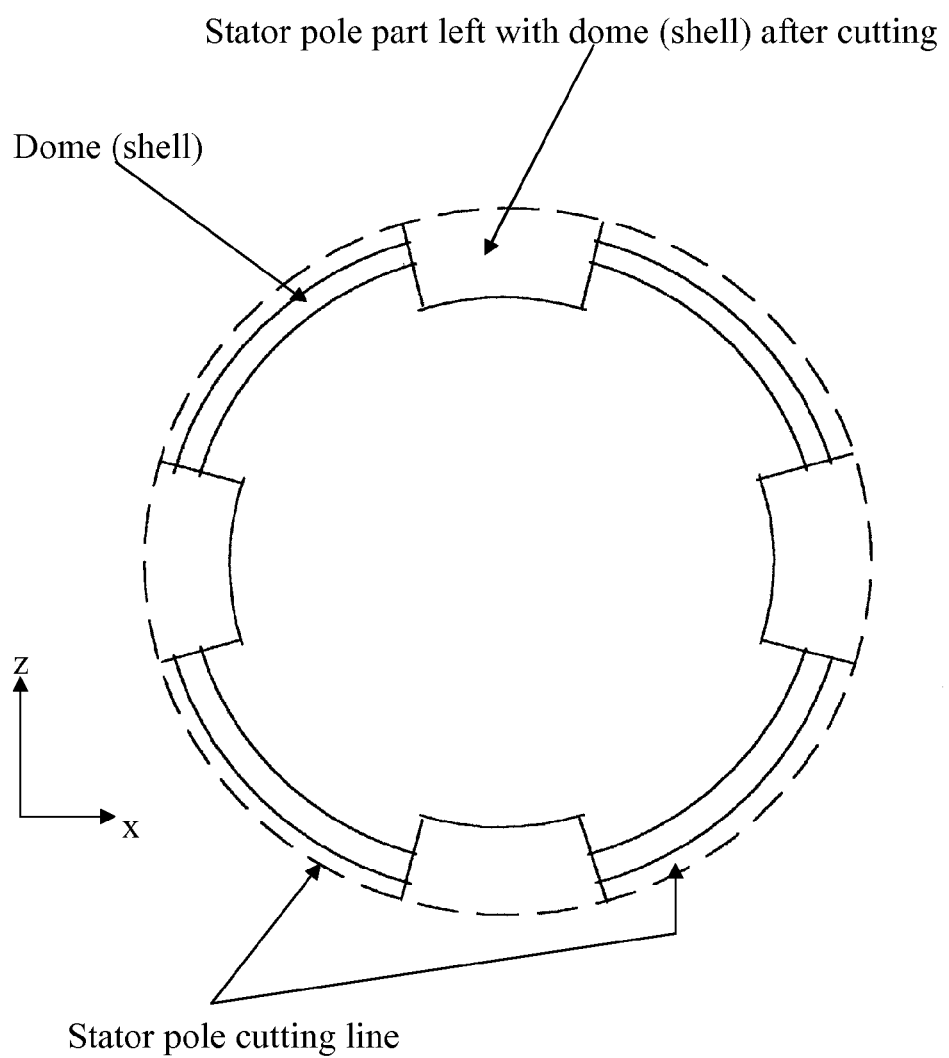
Figure 6:
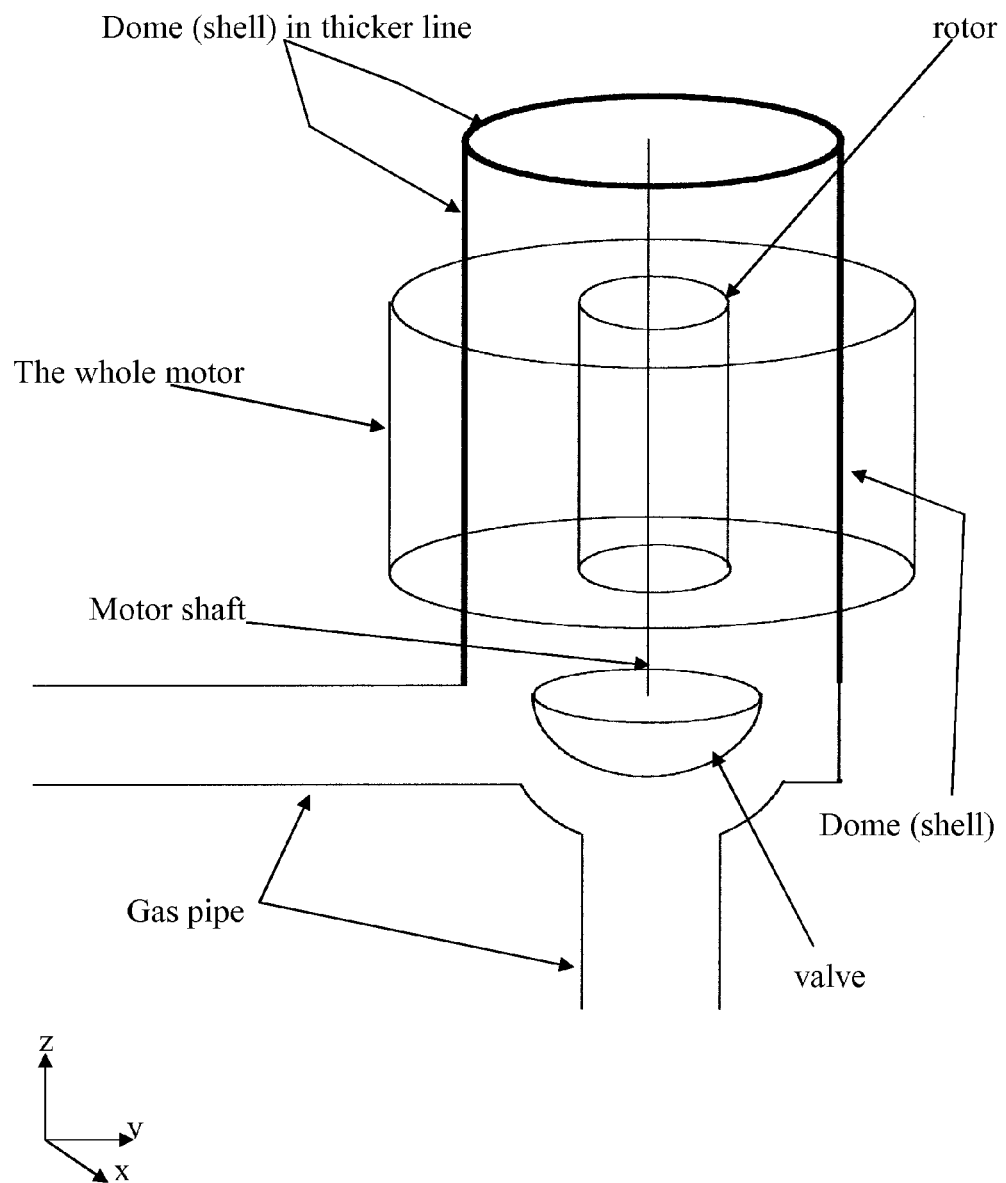

The stator electrical winding of an embodiment of the invention is shown on FIG. 4-5 and its cross section view is shown on FIG. 4-6.

The end edge of the stator poles can be in the same plane as the inside surface of the dome (see FIG. 4-7, and FIG. 4-8 which is the cross section view of FIG. 4-7.) or the edge of stator pole can go further into the dome or shell (see FIG. 4-3, and FIG. 4-4 which is the cross section view of FIG. 4-3). The distance between the edge of stator pole and rotor will be the same as that in a traditional motor, motor efficiency will not be reduced.

The material of the part (which is inside the motor) of the dome, that is surrounding the motor rotor assembly, should be nonmagnetic (or diamagnetic) materials so the magnetic field generated by stator electrical winding will not be changed by the new position of the dome, or the motor may not work, this is indicated in FIG. 4-1. The thickness of the new dome shell, for the part that is welded to stator poles, should be minimum so stator poles can stay same depth as they was but other part of the dome (shell) can be thick. The stator poles also reinforce the dome (shell) where they are welded together. The mechanic strength of the dome for supporting motor and compressor should be strong enough.

Because the stator is a laminated structure (to reduce the eddy current), the refrigerant can leak through between stator pieces. We also need welded stator pieces together (or any other way to seal those gaps between laminated stator pieces). The solder here we use to weld should be able to reduce the eddy current in the stator.

In order to make the new design motor repair job easier we can cut the stator poles in a way like FIG. 5 (as an alternative embodiment of the present invention). The dash line represents the cutting line. So the electrical winding and most part (not the whole part) of stator structure can be detached from motor easily. Also it can be replaced easily. When the stator with the electric winding has been detached from the shell, the shell still remains completely sealed condition because the end part of the stator poles have been welded with the dome. In this alternative embodiment, the efficiency of the motor is reduced due to the small air gap in the stator pole after the cutting. This design is only suitable for where the reliability is a major concern but not the motor efficiency.

The cross section view of FIG. 5 is shown on FIG. 5-1. The stator part, which can be detached from the dome, is show on FIG. 5-2. The cross section view of FIG. 5-2 is shown in FIG. 5-3. After the cutting, the stator pole part left with the dome is shown on FIG. 5-4. The cross section view of FIG. 5-4 is shown on FIG. 5-5.

A motor design in accordance with the present invention can be used as an electronic controlled valve without leak problem because all moving part of the valve is welded sealed inside its dome. (FIG. 6, shell shown with heavy line). A metering device in an a/c or a refrigeration system can also be made with this design. The mechanic force to open and close the valve is generated inside the welded sealed space, not from outside. There is no structural opening as a possible leak in this design.

While particular embodiments of the invention have been described above for purposes of illustration, the invention is not limited to these particular embodiments, and other embodiments will be apparent to those of ordinary skill in the art. Accordingly, it should be understood that the legal scope of the invention is defined by the words of the claims set forth in this patent.

The invention claimed is:

1. An apparatus having a refrigeration cycle, comprising:
a shell forming a closed space;
a compressor located within the shell;
an induction motor having a rotor and a stator having a plurality of stator poles with stator windings associated with each stator pole, the motor being coupled to compressor to drive the compressor;
wherein the rotor is located within the shell, and the shell is welded to the stator poles such that a portion of each stator pole is located within the shell and the stator windings are located outside the shell.

2. The apparatus of claim 1, wherein the portion of the shell welded to the stator poles is composed of non-magnetic material.

3. The apparatus of claim 1, wherein the portion of the shell welded to the stator poles is composed of diamagnetic material.

4. The apparatus of claim 1, wherein the stator poles are laminated structures, and the laminated structures of each stator pole are welded together to prevent a refrigerant gas from leaking between the laminated structures of each stator pole.

5. The apparatus of claim 1, wherein each stator pole includes a small gap such that the portions of the stator poles outside the shell may be removed from the motor.

6. An induction motor system, comprising:
a shell;
an induction motor having a rotor and a stator having a plurality of stator poles with stator windings associated with each stator pole, wherein the stator poles are laminated structures, and the laminated structures of each stator pole are welded together to prevent a gas from leaking between the laminated structures of each stator pole;
wherein the rotor is located within the shell, and a first portion of the stator poles is located within the shell, and a second portion of the stator poles are located outside the shell such that the stator windings are located outside the shell.

7. The induction motor system of claim 6, further comprising a compressor located within the shell and coupled to the rotor, wherein the shell forms a closed space for a hermetic system.

8. The induction motor system of claim 6, wherein the shell includes non-magnetic material.

9. The induction motor system of claim 6, wherein the shell includes diamagnetic material.

10. The induction motor system of claim 6, wherein each stator pole includes a small gap such that the portions of the stator poles outside the shell may be removed from the motor system.

11. A method of constructing an induction motor system, comprising the steps of:
forming a shell around a rotor of an induction motor;
welding the shell to the stator poles for a stator of the induction motor, wherein a portion of the stator poles are located inside the shell, the stator windings associated with each stator pole are located outside the shell;
cutting each stator pole such that the portions of the stator poles outside the shell may be removed from the motor.

12. The method of claim 11, further comprising the step of coupling the rotor of the motor to a compressor, wherein the shell forms a closed space for a hermetic system, and the motor and compressor are located within the shell.

13. The method of claim 11, wherein the step of forming the shell further includes the step of fabricating the shell from a non-magnetic material.

14. The method of claim 11, wherein the step of forming the shell further includes the step of fabricating the shell from a diamagnetic material.

15. The method of claim 11, wherein the stator poles are laminated structures, and further comprising the step of welding the laminated structures of each stator pole together to prevent a gas from leaking between the laminated structures of each stator pole.

16. The method of claim 11, wherein a gap is formed between the stator poles located inside the shell and the stator poles located outside the shell after the step of cutting.

17. An induction motor system, comprising:
   a shell;
   an induction motor having a rotor and a stator having a plurality of stator poles with stator windings associated with each stator pole;
   wherein the rotor is located within the shell, and a first portion of the stator poles is located within the shell, and a second portion of the stator poles are located outside the shell such that the stator windings are located outside the shell, wherein the stator poles include a gap such that the portions of the stator poles outside the shell may be removed from the motor system.

18. The induction motor system of claim 17, further comprising a compressor located within the shell and coupled to the rotor, wherein the shell forms a closed space for a hermetic system.

19. The induction motor system of claim 17, wherein the stator poles are welded laminated structures.

20. The induction motor system of claim 17, wherein the shell is welded to the first portion of the stator poles.

* * * * *